United States Patent [19]

Uno et al.

[11] Patent Number: 5,079,654

[45] Date of Patent: Jan. 7, 1992

[54] DATA TRANSDUCER POSITION CONTROL SYSTEM FOR DATA TRANSFER APPARATUS EMPLOYING DISLIKE RECORD MEDIA

[75] Inventors: Hisatoshi Uno; Akira Takeda, both of Tokyo; Sumio Wada, Koga; Kazuhiko Yasuda, Fussa, all of Japan

[73] Assignee: Teac Corporation, Tokyo, Japan

[21] Appl. No.: 358,670

[22] Filed: May 30, 1989

[51] Int. Cl.$^5$ ............................................. G11B 5/596
[52] U.S. Cl. ............................... 360/78.14; 360/77.08
[58] Field of Search ........................... 360/77.08, 78.14

[56] References Cited

U.S. PATENT DOCUMENTS

| | | | |
|---|---|---|---|
| 4,424,543 | 1/1984 | Lewis et al. | 360/77.08 |
| 4,499,511 | 2/1985 | Sugaya | 360/77.08 |
| 4,516,162 | 5/1985 | West | 360/77.08 |
| 4,590,526 | 5/1986 | Loatt et al. | 360/78.14 |
| 4,631,606 | 12/1986 | Sugaya | 360/78.14 |
| 4,823,212 | 4/1989 | Knowles et al. | 360/77.08 |
| 4,825,310 | 4/1989 | Song | 360/77.08 |

*Primary Examiner*—Aristotelis Psitos
*Assistant Examiner*—David L. Robertson
*Attorney, Agent, or Firm*—Woodcock Washburn Kurtz Mackiewicz & Norris

[57] ABSTRACT

A disklike record medium such as a magnetic data storage disk, and a closed-loop servo control system for positioning a transducer such as a magnetic read/write head on any of a multiplicity of concentric tracks on the record medium. The tracks on the record medium are divided into a plurality of groups, and each track of each group has a different code character prerecorded thereon as in the form of discretely magnetized regions. All the groups of tracks have the same set of code characters assigned thereto for the simplicity of the code characters. Read by the transducer, the code characters enable the control system to individually identify all the tracks of all the groups. In response to an externally supplied track command indicative of a destination track on which the transducer is to be positioned, and to internally supplied track code data, the control system causes translation of the transducer from a departure track to the destination track during track seek operations.

4 Claims, 6 Drawing Sheets

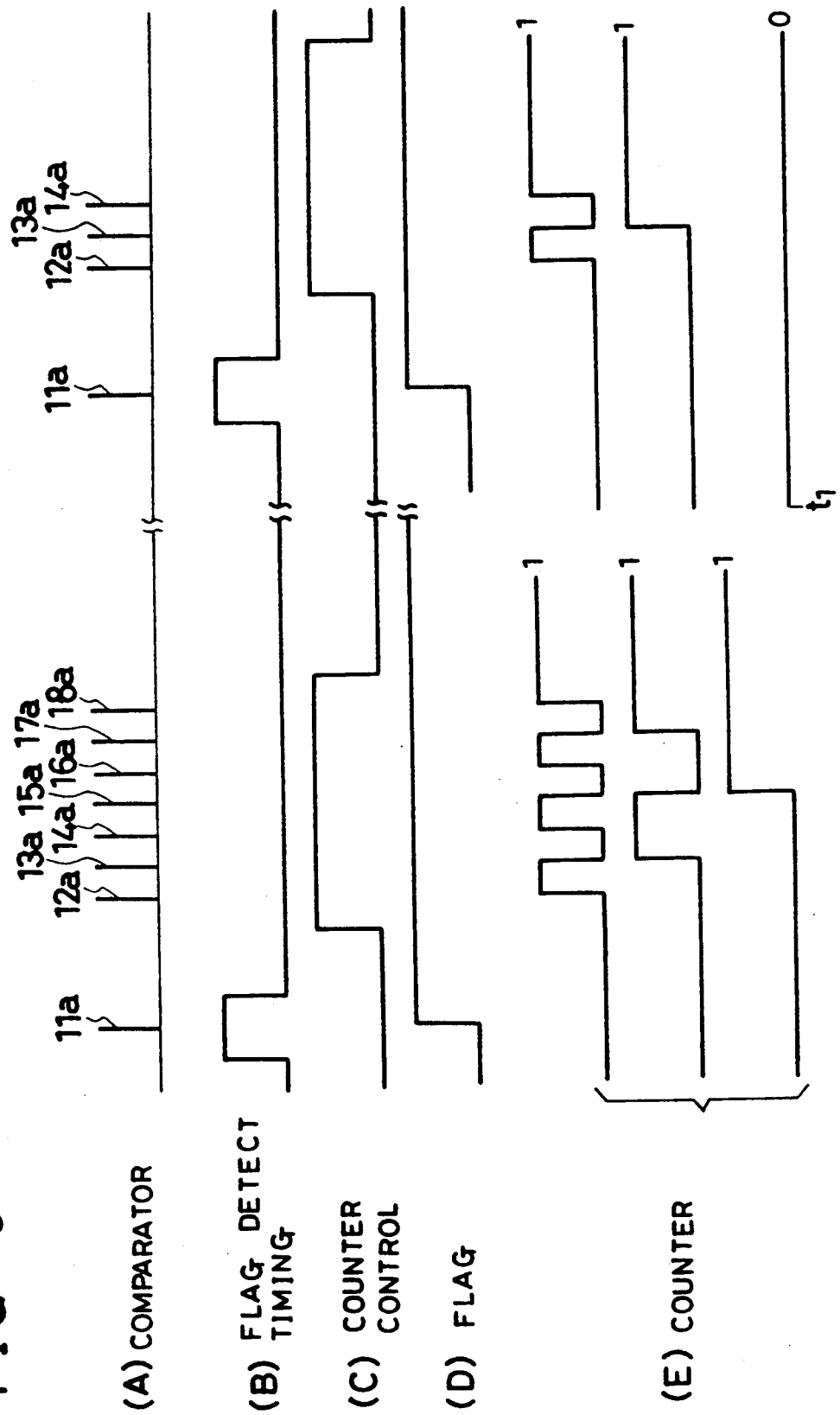

DATA TRANSDUCER POSITION CONTROL SYSTEM FOR DATA TRANSFER APPARATUS EMPLOYING DISLIKE RECORD MEDIA

BACKGROUND OF THE INVENTION

Our invention relates to generally an apparatus for the transfer (reading and/or writing) of data with disklike record media such as magnetic disks notably including those of the "fixed" or hard disk variety. More particularly, our invention pertains to a closed-loop servo system for the positional control of a data transducer in such apparatus in seeking any desired one of a plurality or multiplicity of concentric data tracks on a disklike record medium. Our invention also particularly concerns the record medium itself, featuring code patterns prerecorded thereon for identification of the individual tracks.

We are aware of three typical methods have been known and used for positioning the transducer with respect to a multiplicity of concentric data tracks on hard magnetic disks. They are: (a) the servo system with a servo head and a replicated servo surface on the disk; (b) the servo system employing an encoder for the detection of the positional relationship between the head and the data tracks; and (c) the open-loop system with a stepper motor for moving the head a distance specified by the number of stepping pulses.

The first recited servo positioning system has the disadvantage that only one side of the disk can be utilized for data storage, the other side being used exclusively for servo control positioning of the transducer. Another drawback is the high cost of the equipment needed for creating the servo control information on the disk. The second mentioned servo system is also objectionable because of the high cost of the equipment including the encoder which is complex in construction. The third, open-loop system is unsatisfactory in the speed of seek operation.

It has also been suggested to prerecord addresses at individual tracks on the disk. In seeking any of such addressed tracks the transducer reads the prerecorded addresses until it is positioned on the destination track. Although capable of accurately positioning the transducer on any desired track, this scheme has the inherent weakness that the track addresses demand a greater number of bits for identification of individual tracks as the track density per disk is increased, as is the current trend. Consequently, with such greater track density disks, it becomes increasingly difficult to move the transducer across the closely spaced tracks as sufficiently high speed as the transducer must read the addresses comprised of greater numbers of bits.

SUMMARY OF THE INVENTION

We have hereby invented how to speedily and accurately position a data transducer on any of a plurality or multiplicity of data tracks on a disklike record medium without the shortcomings of the prior art.

Briefly stated in one aspect thereof, our invention concerns an improved disklike record medium having a multiplicity of concentric tracks formed thereon, for use in or with a data transfer apparatus having a transducer to be positioned on any selected one of the tracks on the record medium for reading and/or writing data thereon. The tracks on the record medium are divided into a plurality of groups. Each track of each group has a different code character recorded thereon, but all the groups of tracks have the same set of code characters assigned thereto. The code characters are recorded in a form (e.g. discretely magnetized and unmagnetized regions) that permits reading by the transducer, so that the data transfer apparatus can individually identify the tracks and position the transducer on any of the tracks through a closed-loop servo control system.

It will have been seen that our invention requires only as many different code characters as the number of tracks (e.g. sixteen) in each group. Each code character can therefore be constituted of a drastically smaller number of code elements (e.g. discretely magnetized and unmagnetized regions) than if different code characters were used for all the tracks on the disk. Such shorter code characters are easier of reading by the transducer and so contributes to the faster positioning of the transducer on any desired track. No code characters are needed for identification of the track groups; only, the code characters for the individual tracks of each group may be so composed with such a periodicity as to enable the servo control system to recognize the groups from the track code characters that have been read during each track seek operation.

Preferably, for greater simplicity of the track code characters, each group of tracks may be subdivided into two subgroups, and the same set of code characters may be assigned to both subgroups of each track group. A discrimination between the two subgroups can be accomplished simply by recording an additional code element on the tracks of either of the two subgroups. In this manner, if each group of sixteen tracks are subdivided into two subgroups each consising of eight tracks, as in the preferred embodiment disclosed herein, then only up to eight code elements are needed to provide the sixteen different code characters for each track group and, therefore, for all the tracks on the disk.

An additional advantage is that the track code of our invention does not demand one complete disk surface for recording. The track code may be written, along with other servo control information, on one or more servo sectors alternating with data sectors on the disk. The data sectors can be reserved for the storage of desired data by the user. It is also an advantage that the track code can be prerecorded by the transducer itself, without use of any such expensive equipment heretofore required for the creation of the replicated servo surfaces. The expensive encoders are also unnecessary.

Stated in another aspect thereof, our invention pertains to a closed-loop servo control system for positioning a transducer on any of the concentric tracks of the disklike record medium on which the track code is prerecorded as set forth in the foregoing. The closed-loop control system comprises control means connected between the transducer and the drive means coupled to the transducer for bidirectionally driving the same across the tracks on the record medium. Detecting the present position of the transducer from the code characters read by the transducer, the control means causes actuation of the drive means so as to make zero the difference between the present track and a destination track requested by an externally supplied track command, for positioning the transducer on the destination track. The seek speed is much higher than that of the conventional stepper motor system.

The above and other features and advantages of our invention will become more apparent, and the invention itself will best be understood, from a study of the following description and appended claims, with reference had to the attached drawings showing the preferred embodiment of our invention.

BRIEF DESCRIPTION OF THE DRAWINGS

FIG. 6, consisting of (A)–(E), is a series of waveform and timing diagrams useful in explaining the operation of the positioning system of FIG. 1;

FIG. 7 is a waveform diagram plotting the curve of the transducer position signal, generated in the positioning system of FIG. 1, against the transducer position with respect to the tracks on the magnetic disk;

DESCRIPTION OF THE PREFERRED EMBODIMENT

Figure 1:
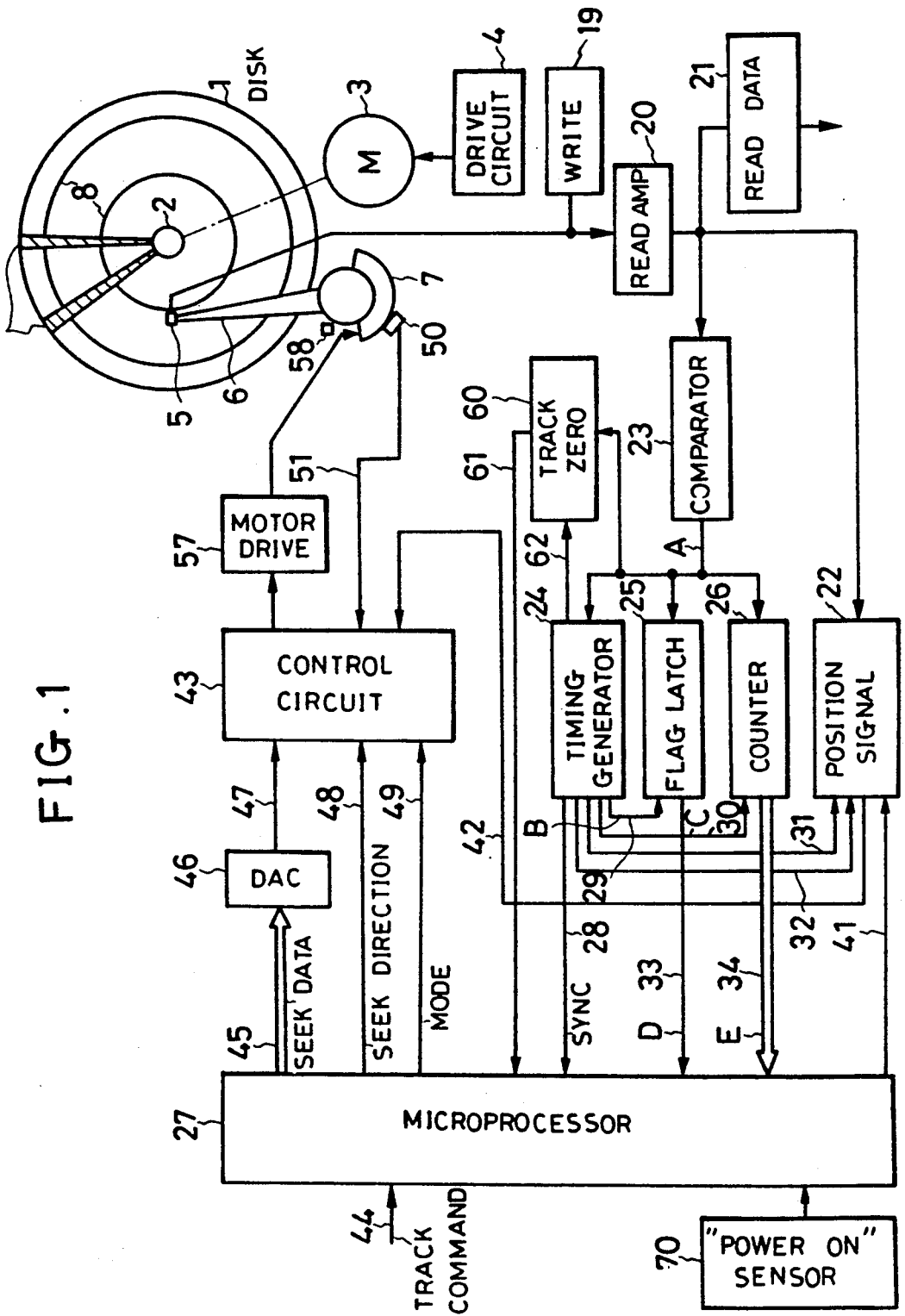
FIG. 1 is a block diagram of the transducer positioning system embodying the principles of our invention, the positioning system including a hard magnetic disk as an example of record media to which our invention is applicable.

We will now describe the transducer positioning system of our invention in detail as adapted for a hard disk data storage and retrieval system shown diagrammatically in FIG. 1. At 1 is shown a hard magnetic disk mounted fast on a drive hub 2, although in practice a stack of two or more such disks might be employed. A disk drive motor 3 is coupled directly to the drive hub 2. A motor control and drive circuit 4 is electrically connected to the disk drive motor 3 for revolving the disk 1 at a predetermined speed.

Let us assume for the convenience of disclosure that the magnetic disk 1 is single sided. Thus, in FIG. 1, one electromagnetic transducer or head 5 is shown mounted to a distal end of a head support beam 6 of resilient material for data transfer with one side of the disk 1 on which is formed a series of concentric tracks to be detailed subsequently. The head support beam 6 is proximally mounted to a seek motor herein shown as a voice-coil motor 7. We understand that the voice-coil motor 7 conventionally comprises a permanent magnet and a coil, both not shown because of their well known nature. The controlled energization of the unshown coil results in the bidirectional angular displacement of the support beam 6 in a plane parallel to the plane of the disk 1 and, in consequence, of the travel of the transducer 5 back and forth across the tracks on the disk.

The disk 1 has a multiplicity of tracks 8 formed concentrically thereon. We have shown only the radially outmost and radially inmost ones of such tracks in FIG. 1 for simplicity. Each track 8 bears some prerecorded information in accordance with a predetermined format. We assume in this particular embodiment that the disk 1 has sixteen data sectors and sixteen servo sectors of interleaved arrangement. We have, however, indicated only two of the servo sectors by the hatching and designated them 10 for illustrative convenience.

Figure 2:
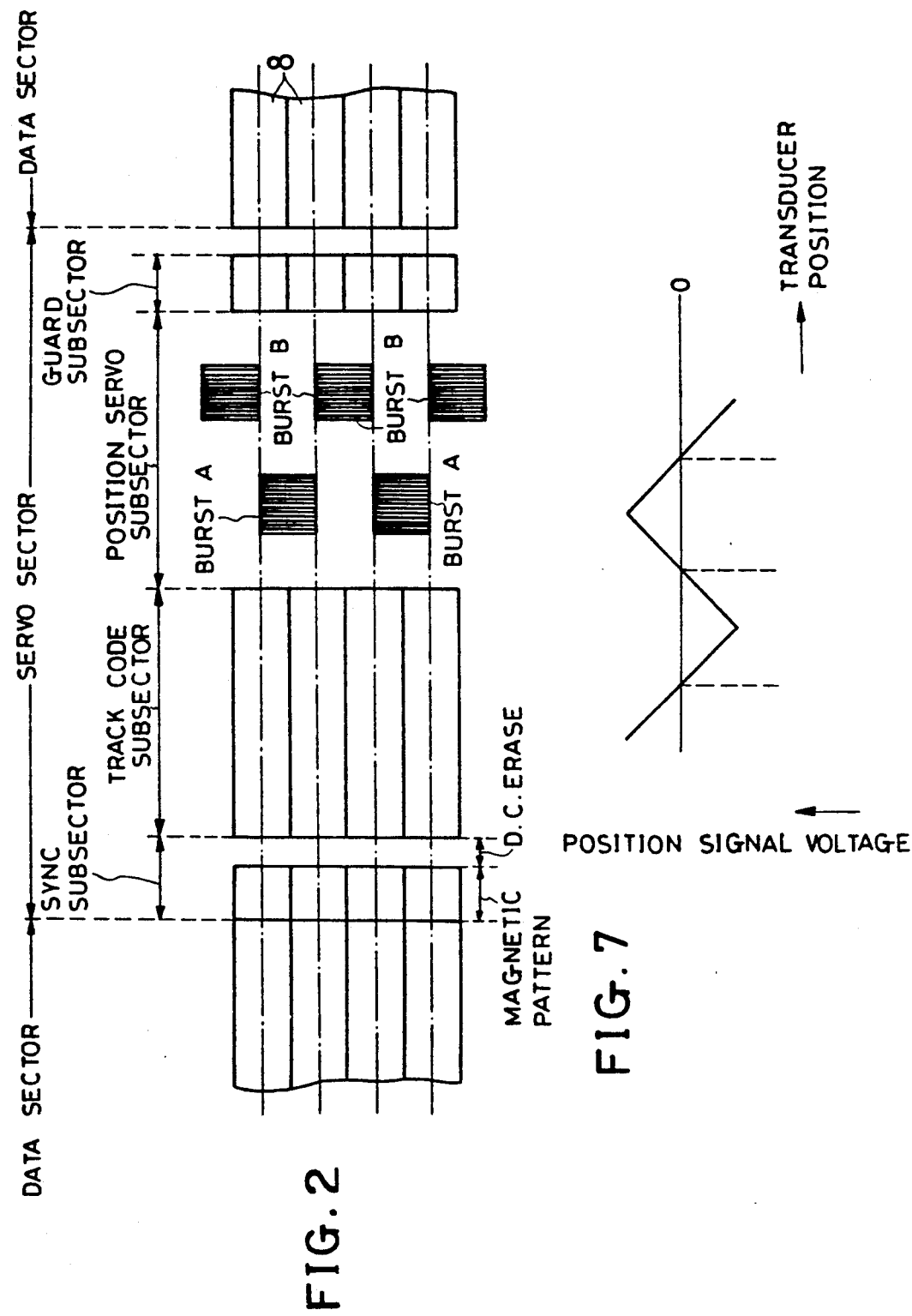
FIG. 2 shows, in developed form, one of the servo sectors on the magnetic disk used in the positioning system of FIG. 1.

As schematically illustrated in FIG. 2, each servo sector 10 of the disk 1 resolves itself into a sync subsector, a track code subsector, a position servo subsector, and a guard subsector. The sync subsector of each track contains a zone for recording magnetic patterns and a d.c. erase zone for synchronization purposes. The position servo subsector of each track contains a servo burst A disposed on one side of the track centerline, and a servo burst B disposed on the other side of the track centerline.

Figure 3:
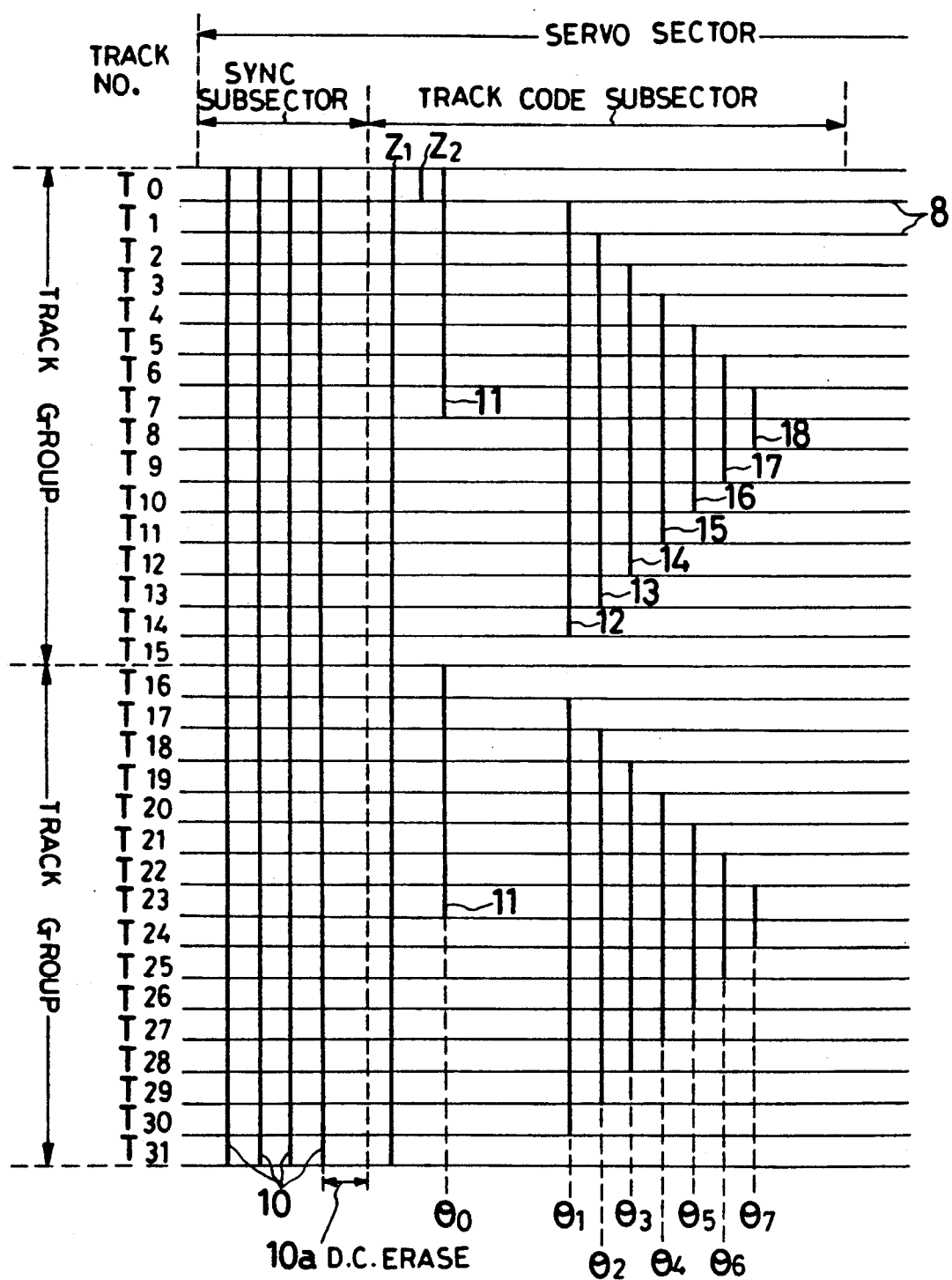
FIG. 3 is a more detailed illustration of part of the servo sector of FIG. 2, including the track code subsector on which the track code is recorded.

FIG. 3 is a more detailed illustration of the sync subsector and track code subsector of each servo sector of the disk 1. The sync subsector has four discrete magnetized regions 10 and one d.c. erase zone 10a which determines the position for synchronization. The track code subsector contains code characters assigned to the individual tracks 8 for their identification in accordance with our invention. The elements making up each such code character are the presence or absence of magnetized regions in specific angular positions on the disk, as set forth in more detail hereafter.

For simplicity of code characters to be assigned to the individual tracks 8, we suggest that all the tracks 8 on the disk 1 be divided into a plurality of groups each consisting of, for example, 16 tracks. The same set of code characters can be assigned to each group of tracks 8 if the groups can be distinguished from one another by means to be detailed subsequently. Thus, as depicted in FIG. 3, the first group of 16 tracks, consisting of Track $T_0$ to Track $T_{15}$, has the same set of code characters as the second group of 16 tracks consisting of Track $T_{16}$ to Track $T_{31}$.

Further, for greater simplicity of the track code characters, we recommend that each group of tracks be subdivided into two subgroups of the same number. Track $T_0$ to $T_7$ of the first group, for example, makes up the first subgroup, and Tracks $T_8$ to $T_{15}$ the second subgroup, in this particular embodiment.

We will now explain the set of code characters assigned to Tracks $T_0$ to $T_{15}$ of the first group by way of example, it being understood that the same explanation applies to each of all the other groups of tracks on the disk 1. First of all, the first subgroup $T_0$ to $T_7$ of the first group of tracks has magnetized regions 11, whereas the second subgroup $T_8$ to $T_{15}$ has not, in order to provide a flag that is used for distinguishing the two subgroups from each other. The magnetized regions 11 are all situated in the same angular position $\theta_0$ on the disk 1. Track $T_0$ has only the magnetized regions 11 for identification. Track $T_{15}$ has no magnetized regions. Tracks $T_1$ to $T_{14}$ in between have first to seventh magnetized regions 12–18 for distinction from each other and from the other two tracks $T_0$ and $T_{15}$ of the first group. The following is a more detailed study of the magnetized regions 12–18 assigned, either singly or in combinations of two or more, to Tracks $T_1$ to $T_{14}$ as their code characters.

Tracks $T_1$ and $T_{14}$ have both only the first magnetized region 12 in the first angular position $\theta_1$. Tracks $T_2$ and $T_{13}$ have both the second magnetized region 13 in the second angular position $\theta_2$, in addition to the first magnetized region 12. Tracks $T_3$ and $T_{12}$ have both the third magnetized region 14 in the third angular position $\theta_3$, in addition to the first and second magnetized regions 12 and 13. Tracks $T_4$ and $T_{11}$ have both fourth magnetized region 15 in the fourth angular position $\theta_4$, in addition to the first to third magnetized regions 12–14. Tracks $T_5$ and $T_{10}$ have both the fifth magnetized region 16 in the fifth angular position $\theta_5$, in addition to the first to fourth magnetized regions 12–15. Tracks $T_6$ to $T_9$ have both the sixth magnetized region 17 in the sixth angular position $\theta_6$, in addition to the first to fifth magnetized regions 12–16. Tracks $T_7$ and $T_8$ have both the seventh magnetized region 18 in the seventh angular position $\theta_7$, in addition to the first to sixth angular positions 12–17.

It is now apparent that Tracks $T_0$ to $T_{15}$ of the first group are individually identifiable by the above described arrangements of the magnetized regions 11–18. The tracks of each of the other groups are likewise identifiable since the arrangements of the magnetized regions 11–18 are the same in each such group.

Contrary to the showing of FIG. 3, the magnetized regions 10–18 may not extend across the track boundaries but may be formed discretely within the bounds of the respective tracks. However, such discretely magnetized regions will result of necessity if the transducer 5 is used for creating them.

The track code subsector additionally contains magnetized regions $Z_1$ and $Z_2$ for the detection of Track $T_0$. Track $T_0$ contains both magnetized regions $Z_1$ and $Z_2$. All the other tracks contain only the magnetized region $Z_1$.

Referring back to FIG. 1, we will now describe the electronic circuit configuration of the data storage and retrieval system insofar as is concerned with the servo positioning of the transducer 5 on any of the tracks 8 on the magnetic disk 1. In the course of such description we will refer also to the waveform and timing diagrams (A) through (E) in FIG. 6. FIG. 1 indicates by the same capitals A through E the parts where the correspondingly designated waveforms of FIG. 6 appear.

The transducer 5 is electrically coupled to both a write circuit 19 and a read amplifier 20. The read amplifier 20 is connected to a read data circuit 21 which in fact is a wave-shaping circuit capable of generate a train of pulses representative of read data as the transducer 5 reads the data sectors of the disk 1.

The read amplifier 20 is also connected to both a position signal circuit 22 and a comparator 23, which both take part in the servo control of the transducer position on the disk 1. The position signal circuit 22 provides the positional information of the transducer 5 with respect to the centerlines of the disk tracks 8 in response to the transducer output signal portions representative of the servo bursts A and B, FIG. 2, on the disk 1. The comparator 23 functions as a wave-shaping circuit for deriving from the transducer output signal the portions representative of the magnetized regions 10–18, FIG. 3, in the sync subsector and track code subsector of each servo sector of the disk 1. The output signal of the comparator 23 is given at (A) in FIG. 6.

Connected to the output of the comparator 23 are a timing generator 24, a flag latch circuit 25 and a counter 26. The timing generator 24 derives the following timing signals from the comparator output: (a) a SYNC signal representative of the sync data in the sync subsection of the disk; (b) a FLAG DETECT TIMING signal, FIG. 6(B), for use in detecting the magnetized regions 11 in the track code subsection; (c) a COUNTER CONTROL signal, FIG. 6(C), for use in detecting track code data representative of the magnetized regions 12–18 in the track code subsection of the disk; and (d) two SERVO BURST DETECT TIMING signals for use in detecting the servo bursts A and B in the position servo subsection. The SYNC signal is sent over a line 28 to a digital system controller microprocessor 27. The FLAG DETECT TIMING signal is sent over a line 29 to the flag latch circuit 25. The COUNTER CONTROL signal is sent over a line 30 to the counter 26. The SERVO BURST DETECT TIMING signals are sent over lines 31 and 32 to the position signal circuit 22.

The flag latch circuit 25 goes high in response to the comparator output pulses of FIG. 6(A) only during the high states of the FLAG DETECT TIMING signal of FIG. 6(B). Thus, in response to the comparator output pulses 11a representative of the magnetized regions 11 in the track code subsection of the disk 1, the flag latch circuit 25 generates the flag of FIG. 6(D) of delivery to the microprocessor 27 over a line 33. The flag latch circuit 25 could be termed a track subgroup discriminating circuit as its output signal serves to discriminate between the two subgroups of each track group.

The counter 26 responds to the comparator output pulses of FIG. 6(A) only during the high states of the COUNTER CONTROL signal of FIG. 6(C). Therefore, the counter 26 counts the comparator output pulses representative of only the magnetized regions 12–18, FIG. 3, in the track code subsection of the disk. FIG. 6(E) shows the resulting three-bit binary output from the counter 26. This counter output is fed over a bus 34 to the microprocessor 27. The counter 26 may therefore be called a track code detector circuit as it output represents the magnetized regions 12–18 of the track code. Combined with the flag output of the flag latch circuit 25, the counter output enables the microprocessor 27 to individually identify the tracks of each group.

The timing generator 24 delivers reset signals to both flag latch circuit 25 and counter 26 in response to the comparator output pulses representative of the magnetized regions 10 in the sync subsection of the disk. Consequently, the counter 26 restarts counting the comparator output pulses representative of the magnetized regions 12–18 for each servo sector of the disk. As indicated in FIG. 6, seven comparator output pulses 12a–18a representative of the seven magnetized regions 12–18 in one track code subsector have been input to the counter 26 before time $t_1$. The resulting output from the counter 26 is [111] of binary notation. Three comparator output pulses 12a–14a representative of the three magnetized regions 12–14 are input to the counter 26 after the time $t_1$. The resulting output form the counter 26 is [011].

The reader's attention is now directed to the first subgroup of Tracks $T_0$–$T_7$ in FIG. 3. It will be understood from the foregoing going description that the output from the counter 26 is [000], [001], [010], [011], [100], [101], [110] and [111] when the transducer 5 reads the code characters assigned to Tracks $T_0$–$T_7$. Thus the microprocessor 27 can individually identify Tracks $T_0$–$T_7$ on the basis of the three-bit output from the counter 26.

Conventionally, three-bit binary numbers have been used for individually identifying eight tracks. Our invention proposes, instead, the use of different numbers of magnetized regions 12–18 for track identification.

The illustrated embodiment employs a maximum of seven magnetized regions 12-18 for individually coding every eight tracks. The number of the magnetized regions 12-18 progressively increases then decreases in each group of tracks, so that no significant errors will take place as the counter 26 counts the comparator output pulses representative of the magnetized regions.

Since each track group consists of 16 tracks in this embodiment, the two subgroups of each track group are discriminated from each other by the presence or absence of the magnetized regions 11 in the track code subsection of the disk. We understand that the microprocessor 27 is factory preprogrammed as follows for discriminating between the two subgroups of each track group and for individually identifying all the 16 tracks of each group.

As depicted in FIG. 6(D), the flag generated by the flag latch circuit 25 may be binary "1" or "0" depending upon the presence or absence of the magnetized regions 11. The microprocessor 27 uses the three-bit output of FIG. 6(E) from the counter 26 as the track code data for track identification when the flag is binary "1", that is, when the transducer 5 is positioned on any of Tracks $T_0$ to $T_7$.

When the flag is binary "0" in the absence of any magnetized region 11, on the other hand, the microprocessor 27 subtracts the counter output value from 15 in terms of the decimal system. Thus the microprocessor 27 performs the arithmetic operations of $(15-7=8)$ for Track $T_8$, $(15-6=9)$ for Track $T_9$, $(15-5=10)$ for Track $T_{10}$, $(15-4=11)$ for Track $T_{11}$, $(15-3=12)$ for Track $T_{12}$, $(15-2=13)$ for Track $T_{13}$, $(15-1=14)$ for Track $T_{14}$, and $(15-0=15)$ for Track $T_{15}$. Actually, however, the microprocessor 27 makes these computations in the binary system.

Thus the microprocessor 27 is enabled to individually identify the 16 tracks $T_0$-$T_{15}$ of the first group. It should be appreciated that only eight different code elements, comprised of the magnetized regions 11-18, are used for coding the 16 tracks.

Figure 5:
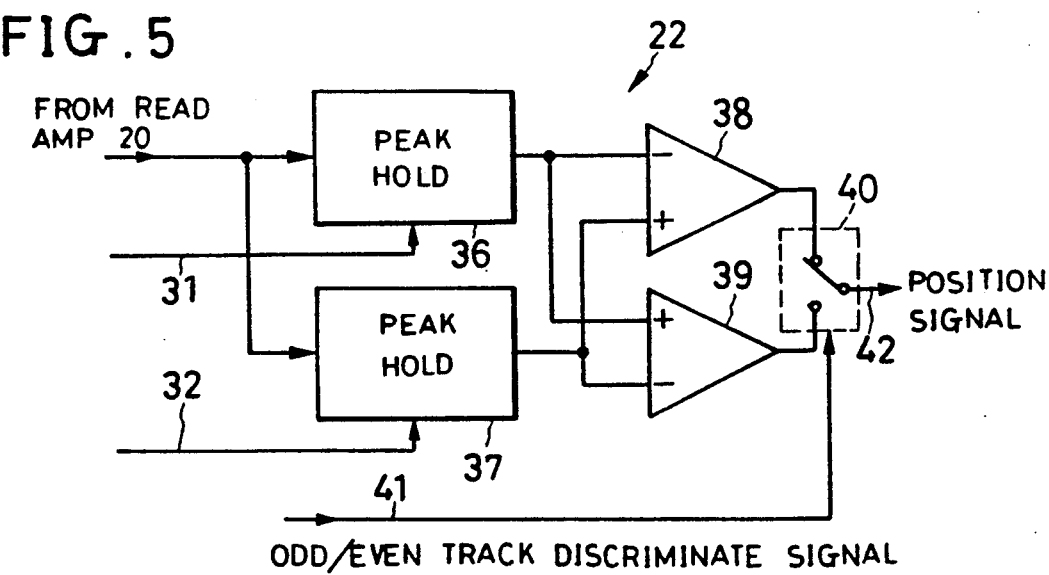
FIG. 5 is a block diagram showing in detail the position signal circuit included in the positioning system of FIG. 1.

FIG. 5 is a detailed illustration of the position signal circuit 22, which functions to generate a TRANSDUCER POSITION signal indicative of whether the transducer 5 is positioned in centerline alignment with a destination track. The position signal circuit 22 comprises two peak hold circuits 36 and 37, both having their inputs connected to the read amplifier 20, FIG. 1. The first peak hold circuit 36 takes in and holds the peak values of the servo bursts A, FIG. 2, in the position servo subsection of the disk under the control of the SERVO BURST DETECT TIMING signal sent over the line 31 from the timing generator 24. The second peak hold circuit 37 takes in and holds the peak values of the servo bursts B under the control of the SERVO BURST DETECT TIMING signal sent over the line 32 from the timing generator 24.

The first peak hold circuit 36 has its output connected both to the inverting input (−) of a first differential amplifier 38 and to the noninverting input (+) of a second differential amplifier 39. The second peak hold circuit 37 has its output connected both to the noninverting input of the first differential amplifier 38 and to the inverting input of the second differential amplifier 39. A reference back to FIG. 2 will make clear the reason for the connection of the peak hold circuits 36 and 37 to the opposite polarity inputs of the differential amplifiers 38 and 39. The servo bursts A and B are each shared by two neighboring tracks; in other words, the servo bursts on the successive tracks are offset in alternately opposite sides of the track centerlines. The two differential amplifiers are intended to compensate for such alternate offsetting of the servo bursts.

The outputs of the differential amplifiers 38 and 39 are both connected to an output select switch 40. This switch is actuated by a signal that is supplied from the microprocessor 27 over a line 41 and which indicates whether the transducer 5 is positioned on odd- or even-numbered tracks. The output select switch 40 selects the output from the first differential amplifier 38 as the TRANSDUCER POSITION signal when the transducer 5 positioned on even-numbered tracks, and the output from the second differential amplifier 39 as the TRANSDUCER POSITION when the transducer is on odd-numbered tracks. Of course, the output from the first differential amplifier 38 represents the result of subtraction of the output from the first peak hold circuit 36 from the output from the second peak hold circuit 37. The output from the second differential amplifier 39 represents the result of subtraction of the output from the second peak hold circuit 37 from the output from the first peak hold circuit 36.

FIG. 7 is an illustration of the voltage waveform of the TRANSDUCER POSITION signal, which is the output from either of the two differential amplifiers 38 and 39. The TRANSDUCER POSITION signal is zero when the transducer 5 is in centerline alignment with any of the tracks 8 on the disk 1. When the transducer 5 is displaced to either side of the track centerline, the TRANSDUCER POSITION signal has a value corresponding to the degree of such displacement. The position signal circuit 22 is connected to a control circuit 43, FIG. 1, by way of a line 42 for the closed-loop servo control of transducer position in accordance with our invention.

A reference back to FIG. 1 will reveal that the comparator 23 is additionally connected to a track-zero detector circuit 60. This circuit derives a TRACK ZERO signal, indicative of whether the transducer 5 is positioned on Track $T_0$ or not, from the comparator output pulses representative of both magnetized regions $Z_1$ and $Z_2$, FIG. 3, on that track. The TRACK ZERO signal is sent over a line 61 to the microprocessor 27. The timing generator 24 is also connected to the track-zero detector circuit 60 to enable the latter to respond only to the comparator output pulses representative of the magnetized regions $Z_1$ and $Z_2$ on Track $T_0$.

We understand that the microprocessor 27 is to be connected to, and controlled by, a computer or other appliance, not shown, as is conventional in the disk drive art. The unshown computer or the like supplies a TRACK COMMAND signal, indicative of a destination track on which the transducer 5 is to be positioned, to the microprocessor 27 over a line 44. The microprocessor 27 responds to this TRACK COMMAND signal by making necessary control for positioning the transducer 5 on the requested destination track. Toward this end the microprocessor 27 is connected to the control circuit 43 via the following three paths: (a) an eight-bit seek data bus 45, a digital-to-analog converter (DAC) 46 and a line 47; (b) a SEEK DIRECTION signal line 48; and (c) a MODE signal line 49.

The seek data sent over the bus 45 represents the amount of transducer translation needed for positioning the transducer on the requested destination track, as well as the speed of such translation. The DAC 46 converts the seek data into an analog signal required by the control circuit 43. Also, the DAC 46 generates a positioning signal (e.g. zero volt) in the tracking mode which comes after each seek operation, as will become apparent as the description proceeds.

The SEEK DIRECTION signal over the line 48 dictates whether the transducer is to be moved radially inwardly or outwardly of the disk 1. The MODE signal over the line 49 discriminates between the seek mode (speed control) and the tracking mode (position control).

Also connected to the control circuit 43 is a transducer speed sensor 50 for generating a voltage signal (TRANSDUCER SPEED signal) indicative of the traveling speed, as well as the traveling direction, of the transducer 5. The speed sensor 50 may comprise a coil, not shown, which moves with the unshown coil of the voice coil motor 7 through the magnetic field.

Figure 4:
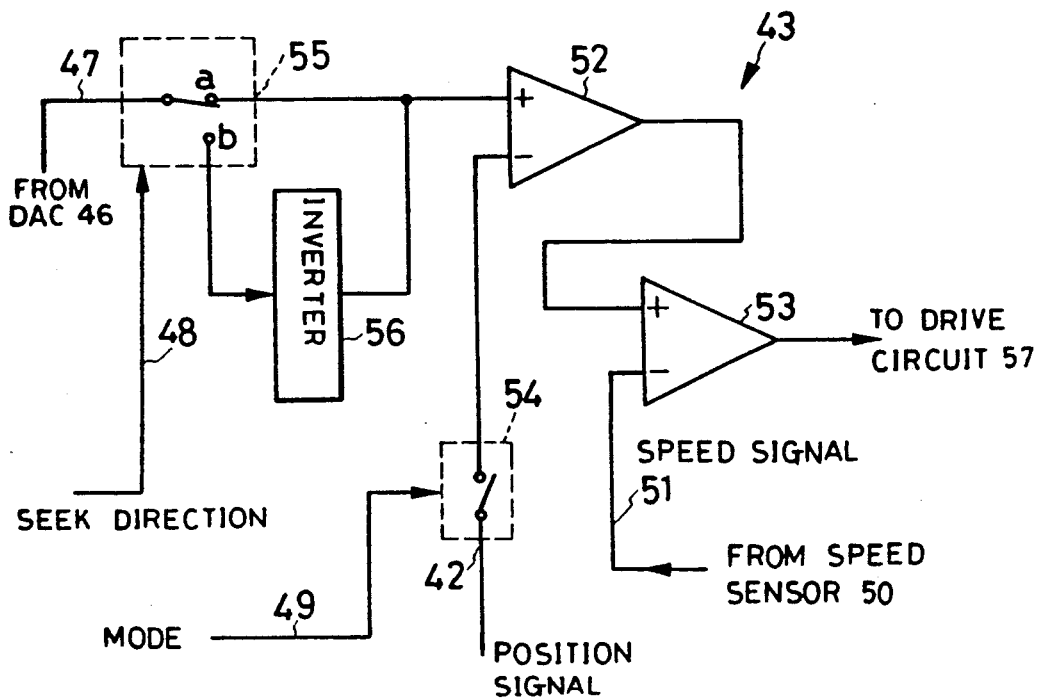
FIG. 4 is a block diagram showing in detail the control circuit included in the positioning system of FIG. 1.

We have shown the control circuit 43 in more detail in FIG. 4. It comprises a first differential amplifier 52 for transducer position control and a second differential amplifier 53 for transducer speed control. The first differential amplifier 52 has an inverting input (−) connected to the TRANSDUCER POSITION signal line 42 via an on/off switch 54. This switch is off when the MODE signal supplied from the microprocessor 27 over the line 49 indicates the seek mode, and on when the MODE signal indicates the tracking mode.

A direction select switch 55 connects the DAC output line 47 to the noninverting input (+) of the first differential amplifier 52 either directly (contact a) or via an inverter 56 (contact b) in response to the SEEK DIRECTION signal fed from the microprocessor 27 over the line 48. The direction select switch 55 connects the DAC output line 47 to the contact a when the SEEK DIRECTION signal dicates the travel of the transducer 5 in the radially inward direction of the disk 1, and to the contact b when the SEEK DIRECTION signal dictates transducer travel in the radially outward direction of the disk.

The second differential amplifier 53 has a noninverting input (+) connected to the first differential amplifier 52 and an inverting input (−) connected to the speed sensor 50 by way of a TRANSDUCER SPEED signal line 51. The output of the second differential amplifier 53 is connected to a motor drive circuit 57, FIG. 1, which in turn is drivingly connected to the voice-coil motor 7.

Seen at 58 in FIG. 1 is a stop for limiting the angular displacement of the voice-coil motor 7. The stop 58 serves the purpose of preventing the transducer 5 from being moved too far beyond the outermost track on the disk 1.

OPERATION

As is standard with the disk drive art, each track-seeking operation of the transducer 5 starts at the outermost Track $T_0$. The transducer 5 is therefore first positioned on Track $T_0$ as the disk 1 starts rotation upon closure of the power switch, not shown, or in response to a calibration command. The following is a more detailed explanation of the procedure for automatically positioning the transducer 5 on Track $T_0$ upon closure of the power switch.

At 70 in FIG. 1 is shown a "power on" sensor circuit for signaling the microprocessor 27 that the power switch is closed and, therefore, that the transducer 5 be positioned on Track $T_0$. Thereupon the microprocessor 27 will command the control circuit 43 to move the transducer radially outwardly of the disk 1. The resulting radially outward travel of the transducer 5 will temporarily come to an end as the voice-coil motor 7 butts on the stop 58. At this time, however, the transducer 5 will not in all likelihood be precisely positioned on Track $T_0$. The fine adjustment of the transducer position is therefore effected thereafter. It is the track-zero detector circuit 60 that determines whether the transducer 5 is positioned on Track $T_0$ or not, by detecting the comparator output pulses representative of both magnetized regions $Z_1$ and $Z_2$ prerecorded on that track.

When the TRACK ZERO signal put out by the track-zero detector circuit 60 indicates that the transducer is positioned on Track $T_0$, the microprocessor 27 will discontinue the seek mode control of the control circuit 43 and will set the latter in the tracking mode. In this tracking mode, as has been explained with reference to FIG. 4, the control circuit 43 will respond to the TRANSDUCER POSITION signal fed from the position signal circuit 22 over the line 42 and will bring the transducer into centerline alignment with Track $T_0$.

Then the microprocessor 27 will reset a track address counter, not shown, that is conventionally built into it. The track address counter produces a signal indicative of the radial position of the transducer 5 on the disk 1 with respect to Track $T_0$.

With the transducer 5 positioned on Track $T_0$ through the foregoing procedure, a track seek operation can now be started with use of the track code of our invention. However, before discussion of the track seek operation, we will briefly explain how the track code of our invention enables the positioning of the transducer on any of a multiplicity of tracks on the disk.

Let us first assume that, traveling radially inwardly of the revolving disk 1, the transducer 5 correctly reads all the code characters assigned to the individual tracks 8, from outmost Track $T_0$ to inmost Track Tn. In that case, in response to the outputs from the flag latch circuit 25 and counter 26, the microprocessor 27 will be able to produce within itself the CONVERTED TRACK CODE signal of FIG. 9 that varies periodically to represent the decimal values 0–15 corresponding to the code characters assigned to each group of 16 tracks. Actually, however, the transducer will relatively travel aslantly across each servo sector of the disk during seek operations, and the servo sectors are interleaved with the data sectors on the disk. It will therefore be practically impossible to read the code characters on all the tracks.

However, according to our invention, the transducer 5 need not read all the code characters at tracks intervening between the departure track and the destination track. All that is required for successful track seek operations with the track code of our invention is that the maximum traveling speed of the transducer be so determined that it will read the track code at least once, preferably twice, within each group of sixteen tracks 8. The maximum allowable speed of the transducer need not be inconveniently low because the disk 1 has as many as sixteen servo sectors 10 at constant angular spacings. If the transducer reads the track code at least once within each group of tracks, the microprocessor 27 can discern the travel of the transducer from one track group to the next and, therefore, the total number of track groups that have been traversed by the transducer. The transducer can be positioned on any track if the microprocessor knows the code character of the destination track and the number of track groups that have been traversed.

Figure 9:
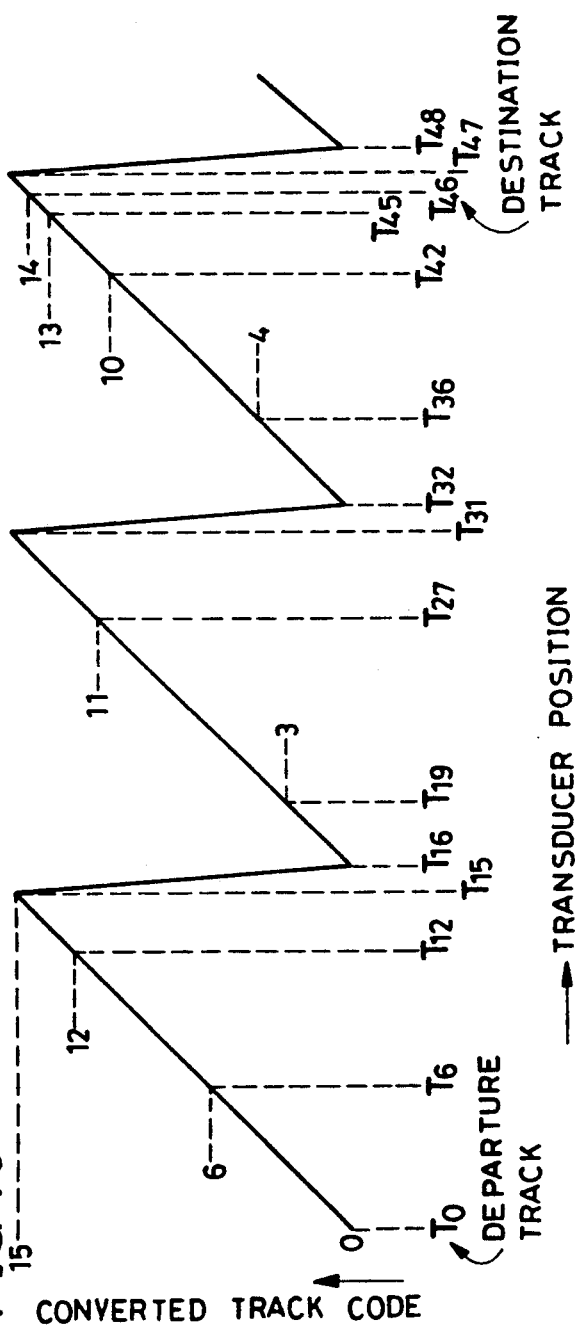
FIG. 9 is explanatory of how the transducer travels from a departure track to a destination track and is positioned on the latter on the basis of the decimal equivalents of the track code characters that have been detected during such travel.

We will now proceed to the discussion of how the transducer 5 is moved from Track $T_0$ to, say, Track $T_{46}$ and positioned in centerline alignment with the latter track, as indicated in FIG. 9. First of all, the microprocessor 27 inputs by way of the line 44, FIG. 1, the TRACK COMMAND signal specifying Track $T_{46}$ as the destination track. The TRACK COMMAND signal does not specify the destination track in terms of the code of our invention but of one of the consecutive numbers assigned to all the tracks on the disk. The microprocessor 27 must then know the present position of the transducer 5. Since we have assumed that the present transducer position is Track $T_0$, the microprocessor computes the difference between the departure track and the destination track; namely, $46-0=46$. The transducer must travel forty-six tracks to the destination track.

The microprocessor 27 proceeds to prepare the seek data, including the seek speed data, and the SEEK DIRECTION signal needed to move the transducer forty-six tracks to the destination track. Inputting the analog equivalent of the seek data from the DAC 46, the control circuit 43 will cause the drive circuit 57 to energize the voice-coil motor 7 with a current value necessary for moving the transducer forty-six tracks at a relatively high predetermined speed.

During such track seek travel of the transducer 5, the speed sensor 50 will send back to the control circuit 43 the TRANSDUCER SPEED signal representative of the actual traveling speed of the transducer. The control circuit 43 will refer the TRANSDUCER SPEED signal to the seek data and make the necessary control for making the actual traveling speed of the transducer equal to the speed specified by the seek data. As has been mentioned, the actual maximum traveling speed of the transducer must be such that it reads the track code at least once within each track group.

Figure 8:
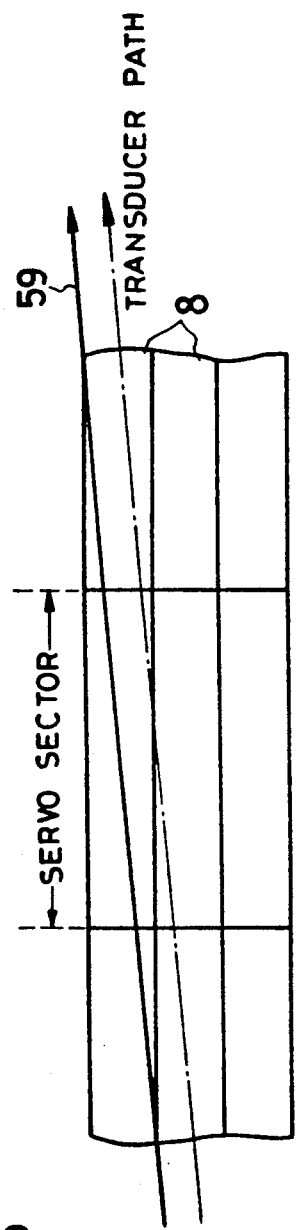
FIG. 8 is a fragmentary illustration of the spiral path followed by the transducer on the revolving magnetic disk during track seek operations.

Since the disk 1 is in rotation during the track seek operation, the transducer 5 will trace a spiral path on the disk, as depicted fragmentarily and designated 59 in FIG. 8. The transducer does not necessarily travel across each track 8 at one of the servo sectors. FIG. 9 indicates, purely by way of illustration, that the transducer read the track code at Tracks $T_6$, $T_{12}$, $T_{19}$, $T_{27}$, $T_{56}$, $T_{42}$, $T_{45}$ and $T_{46}$ but failed to read the track code at the other tracks.

As will be seen by referring back to FIG. 3, the code character assigned to Track $T_6$ is composed of the magnetized regions 11–17. As the transducer reads this code character, the corresponding flag of FIG. 6(D) and the corresponding counter output of FIG. 6(E) will be fed into the microprocessor 27 over the lines 33 and 34 of FIG. 1. Upon identification of Track $T_6$ from these input signals, the microprocessor will compute the remaining number of tracks that must be traversed; that is, $46-6=40$. Then the microprocessor will renew the seek data based upon the remaining number of tracks, for delivery to the control circuit 43. The seek data will be renewed thereafter each time the transducer reads the track code, as at Tracks $T_{12}$, $T_{19}$, $T_{27}$, $T_{36}$, $T_{42}$ and $T_{45}$. Thus the transducer will travel toward the destination track at the optimum speed at every moment.

Since the transducer 5 has its maximum traveling speed so determined as to read the track code at least once in each group of tracks, the microprocessor 27 can know the travel of the transducer through the successive track groups from the values of the detected track code characters. The transducer has traveled from one track group to the next when the decimal value of each detected track code character becomes less than that of the previously detected track code character. For example, in FIG. 9, the transducer reads the track code at Track $T_{19}$ after reading the track code at Track $T_{12}$. The microprocessor knows a transition from one track group to the next because of the decrease, from 12 to 3, of the decimal equivalents of the two successively detected track code characters. It is only Track $T_{19}$ whose track code character is a decimal 3 in the second track group. The microprocessor can thus know that the transducer has just traveled across Track $T_{19}$.

As the transducer 5 reads the track code at Track $T_{42}$, the microprocessor will again compute the remaining number of tracks that must be traversed, as $46-42=4$. On thus knowing that the transducer is now very close to the destination of Track $T_{46}$, the microprocessor will finally renew the seek data, reducing the expected traveling speed of the transducer to a minimum. The transducer will then read the track code more frequently than before and so will detect Track $T_{46}$. Should, however, the transducer has somehow traveled beyond the destination track, the microprocessor will invert the SEEK DIRECTION signal, causing the transducer to return to Track $T_{46}$.

The seek mode of operation has now been completed. The MODE signal sent from microprocessor 27 to control circuit 43 over the line 49 will then dicatate the tracking mode. The control circuit 43 will then respond to the TRANSDUCER POSITION signal from the position signal circuit 22 for fine-adjusting the position of the transducer into centerline alignment with Track $T_{46}$ through the procedure set forth already.

We have so far described the operation of our invention in terms of transducer transfer from Track $T_0$ to Track $T_{46}$. It is self-evident, then, that the same description substantially applies to the translation of the transducer from any departure track to any destination track.

The advantages gained by this particular embodiment of our invention may be summarized as follows:

1. The seven magnetized regions 12–18 constituting the elements of the track code are arranged so regularly that there is little or no possibility of errors taking place in reading them. Even if errors do take place in reading them, such errors will not substantially affect the seek operation, particularly because the number of track elements is incremented and then decremented in each group of tracks.

2. All the tracks on the disk are divided into an appropriate number of groups to make possible the use of a minimum number of elements for each track code character, so that the transducer can read all the elements of each track code character during high speed seek operations.

3. Each track group is divided into two subgroups which are discriminated against each other by the presence or absence of the magnetized region 11 in each track. Only eight magnetized regions 11–18 are required for individually coding the 16 tracks of each group. Moreover, only four bits of information (one bit of the flat plus three bits of the counter output) is required for individually identifying the 16 tracks of each group.

4. The travel of the transducer past the successive groups of tracks are readily recognizable on the basis of the CONVERTED TRACK CODE information given in FIG. 9.

5. The transducer can be transported from any known present track to any requested destination track at the optimum speed at every moment as the microprocessor renews the seek data (including the transducer speed information) each time the transducer detects a code character while seeking the destination track.

POSSIBLE MODIFICATIONS

Despite the foregoing detailed disclosure, we do not wish our invention to be limited by the exact details of the illustrated embodiment. The following is a brief list of possible modifications or alterations of the above disclosed embodiment that will occur to the specialists within the scope of our invention:

1. Different code characters could be assigned to all the tracks of each group, instead of subdividing each track group into two subgroups and discriminating them by the presence or absence of the magnetized regions 11.

2. Binary numbers could be employed for the track code.

3. One complete surface of the disk could be used for recording the track code. The seek speed would then be materially increased, there being the higher possibility of the transducer detecting the track code at least once in each track group during track seeking.

4. Different code characters could be assigned to the respective track groups for individually identifying them.

5. The positioning of the transducer on the outermost usable track (Track $T_0$) could be detected by providing a microswitch or the like on the stop 58, instead of by recording the magnetized regions $Z_1$ and $Z_2$ on the disk.

What we claim is:

1. A disklike record medium having a multiplicity of concentric tracks formed thereon, for use in or with a data transfer apparatus having a transducer to be positioned on any selected one of the tracks on the record medium for reading and/or writing data thereon, the disklike record medium being characterized in that:

(a) the tracks on the record medium are divided into a plurality of groups, each group of tracks subdivided into a plurality of subgroups;

(b) each track has a different code character recorded thereon, the code characters enabling the data transfer apparatus to individually identify the tracks and to position the transducer on any selected one of the tracks through a closed-loop servo control system, said code characters composed of the presence or absence of magnetized regions in preselected angular positions on the record medium; and (c) all the subgroups of tracks have the same set of code characters assigned thereon, the subgroups of each group distinguishable from one another by a code element recorded on the tracks of at least one of the subgroups in each group;

(d) one track of a first subgroup of each group has one magnetized region in a first preselected angular position;

(e) another track of the first subgroup has two magnetized regions in the first and a second preselected angular positions;

(f) one track of a second subgroup has two magnetized regions in the first and the second preselected angular positions;

(g) another track of the second subgroup has one magnetized region in the first preselected angular position; and (h) each track of the first subgroup has an additional magnetized region recorded in an additional preselected angular position thereon by way of contradistinction from the tracks of the second subgroup.

2. A disklike record medium having a multiplicity of concentric tracks formed thereon, for use in or with a data transfer apparatus having a transducer to be positioned on any selected one of the tracks on the record medium for reading and/or writing data thereon, the disklike record medium being characterized in that:

(a) the tracks on the record medium are divided into a plurality of groups, each group of tracks subdivided into a plurality of subgroups;

(b) each track has a different code character recorded thereon, the code characters enabling the data transfer apparatus to individually identify the tracks and to position the transducer on any selected one of the tracks through a closed-loop servo control system, said code characters composed of the presence or absence of magnetized regions in preselected angular positions on the record medium; and (c) all the subgroups of tracks have the same set of code characters assigned thereon, the subgroups of each group distinguishable from one another by a code element recorded on the tracks of at least one of the subgroups in each group;

(d) each group comprises first to sixteenth tracks arranged sequentially, with the first to eighth tracks constituting the first subgroup and with the ninth to sixteenth tracks constituting the second subgroup;

(e) the first and sixteenth tracks of each group have no magnetized region recorded thereon;

(f) the second and fifteenth tracks of each group each have a magnetized region in a first preselected angular position;

(g) the third and fourteenth tracks of each group each have magnetized regions in the first and a second preselected angular positions;

(h) the fourth and thirteenth tracks of each group each have magnetized regions in the first and the second and a third preselected angular positions;

(i) the fifth and twelfth tracks of each group each have magnetized regions in the first and the second and the third and a fourth preselected angular positions;

(j) the sixth and eleventh tracks of each group each have magnetized regions in the first and the second and the third and the fourth and a fifth preselected angular positions;

(k) the seventh and tenth tracks of each group each have magnetized regions in the first and the second and the third and the fourth and the fifth and a sixth preselected angular positions;

(l) the eight and ninth tracks of each group each have magnetized regions in the first and the second and the third and the fourth and the fifth and the sixth and a seventh preselected angular positions; and (m) each track of either of the first and second subgroups of each group has an additional magnetized region recorded in an additional preselected angular position thereon by way of contradistinction from the tracks of the other of the first and second subgroups.

3. In a data transfer apparatus, in combination:
(a) a disklike record medium having formed thereon
   (i) a multiplicity of concentric tracks divided into a plurality of groups, each track of each group having a different code character recorded thereon and all groups of tracks having the same set of code characters assigned thereto, and (ii) a servo sector on which there is recorded servo data including the track code characters;
(b) means for imparting rotation to the record medium;
(c) a transducer for data transfer with the record medium, the transducer being capable of reading the code characters on the record medium;
(d) drive means for driving the trandsucer across the tracks on the record medium; and
(e) control means connected between the transducer and the drive means and responsive to an externally supplied track command indicative of a destination track on which the transducer is to be positioned, the control means being capable of detecting, on the basis of the code characters read by the transducer, the track on which the transducer is presently positioned and of actuating the drive means so as to zero the difference between the present track and the destination track for positioning the transducer on the destination track, the control means comprising:
   (i) wave-shaping means connected to the transducer for providing servo data pulses representative of the servo data read from the record medium;
   (ii) a timing generator connected to the wave-shaping means for providing first and second timing signals in response to the servo data pulses;
   (iii) a track code detector circuit connected to both the wave-shaping means and the timing generator for deriving from the servo data pulses a track code signal representative of the track code characters read from the record medium, in response to the first timing signal;
   (iv) a departure track detector circuit connected to both the wave-shaping means and the timing generator for deriving a departure track signal, which is representative of a predetermined departure track on the record medium, from the servo data pulses in response to the second timing signal;
   (v) a departure track request circuit for providing a departure track request signal requesting that the transducer be positioned on the departure track;
   (vi) control circuit means connected to the drive means for controllably actuating the same; and
   (vii) a microprocessor connected to the timing generator and the track code detector circuit and the departure track detector circuit and the departure track request circuit and the control circuit means, the microprocessor being responsive to both the departure track request signal and the departure track signal for causing the control circuit means and the drive means to position the transducer on the departure track, and to both the external track command and the track code signal for causing the control circuit means and the drive means to move the transducer from the departure track to the destination track.

4. The data transfer apparatus of claim 3 wherein each group of tracks on the record medium are subdivided into two subgroups, both subgroups of each group having the same set of code characters assigned thereto, the two subgroups of each group being distinguished from each other by a code element recorded on servo sector of the record medium, wherein the timing generator generates a third timing signal in response to the servo data pulses which include those representative of the code element discriminating between the two subgroups of each track group, and wherein the control means further comprises a track subgroup discriminating circuit connected to both the wave-shaping means and the timing generator for deriving a flag signal, which is representative of discrimination between the two subgroups of each track group, from the servo data pulses in response to the third timing signal, the track subgroup discriminating circuit being also connected to the microprocessor to enable the latter to individually identify all the tracks of each group.

* * * * *